A. C. SMITH.
Land Marker.
No. 108,644. Patented Oct. 25, 1870.
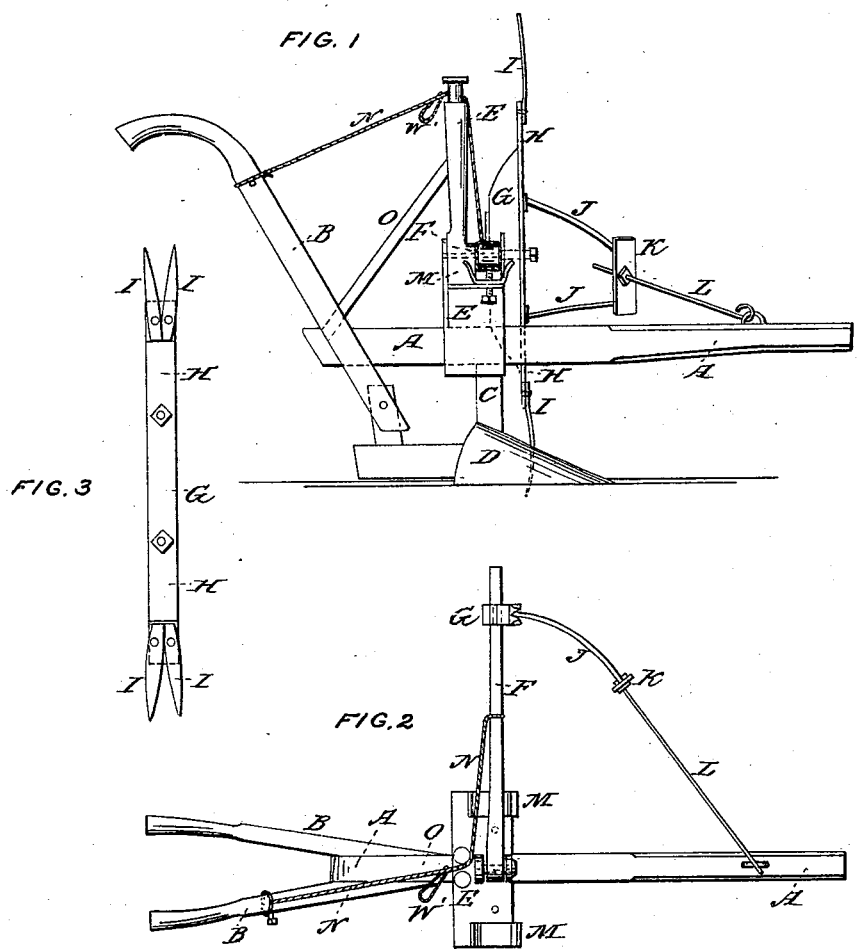

United States Patent Office.

ARTHUR C. SMITH, OF JOYNER'S DEPOT, NORTH CAROLINA.

Letters Patent No. 108,644, dated October 25, 1870.

IMPROVEMENT IN LAND-MARKERS FOR CORN-PLANTING.

The Schedule referred to in these Letters Patent and making part of the same.

*To all whom it may concern:*

Be it known that I, ARTHUR C. SMITH, of Joyner's Depot, in the county of Wilson and State of North Carolina, have invented a new and useful Improvement in Land-Markers; and I do hereby declare that the following is a full, clear, and exact description thereof, which will enable others skilled in the art to make and use the same, reference being had to the accompanying drawing forming part of this specification, in which—.

Figure 1 is a side view of my improved marker, as attached to a plow.

Figure 2 is a top view of the same.

Figure 3 is a detail view of the marking-bar.

Similar letters of reference indicate corresponding parts.

My invention has for its object to furnish an improved marker for attachment to plows, to mark the land for the next row, so that the rows may be at an equal distance apart throughout their whole length; and—

It consists in the arrangement and combination of the various parts of the marker to adapt it for attachment to a plow beam, as hereinafter more fully described.

A represents the beam;

B, the handles;

C, the standard; and

D, the plow, about the construction of which parts there is nothing new.

E is a standard, the lower end of which is secured, by bolts or screws, to the beam, directly, or nearly directly, over the plow D.

To the lower part of the standard E is pivoted the end of the bar F by a pin or bolt, so that the said bar may be turned from one side to the other of the said standard and beam.

To the outer part of the bar F is attached a cross-bar, G, in such a way that it may be moved toward or from the plow-beam to adjust it according to the desired width of the rows.

To the forward side of the bar G is attached a bar or plate, H, of spring steel, to the projecting ends of which are attached the steel points I, by which the ground is marked.

To the bar G, upon opposite sides of and equally distant from its middle point, are attached the rear ends of two rods, J, the forward ends of which are attached to the ends of a short bar or yoke, K, through a hole, in the center of which passes the rear end of the rod L, which has a screw-thread cut upon it, and is adjustably secured in place by two nuts screwed upon it, upon each side of the bar K, so that it may be conveniently adjusted to conform to the adjustment of the marking bar G H I.

The forward end of the rod L is pivoted to the forward part of the upper side of the beam A.

To the lower part of the standard E, beneath the pivoted end of the bar F, are attached arms M, projecting at each side of the plow-beam A, to support the pivoted bar F, and prevent the marker from dropping down too low.

The arms M are raised and lowered as desired, by set-screws passing up through the supports of said arms, as shown in figs. 1 and 2.

N is a cord attached to the bar F at or near its middle part, and which passes between two rollers pivoted to the upper end of the standard E.

The other end of the cord N is attached to the plow-handle B.

The cord N has a loop, $n'$, formed upon it, to serve as a handle in operating it, and which may be hooked upon a screw or other catch attached to said handle, when it is desired to hold the marker away from the ground.

By drawing upon the rope N the plowman may, at any time, raise the marker from the ground to pass over or around obstructions, and by giving a sharp pull to said cord the marker will be raised into a vertical position, and its momentum will carry it over to the other side of the beam A, so that the marker may work upon either side of the plow, as may be desired.

The standard E is strengthened by the brace O, the upper end of which is attached to the upper part of said standard, and the lower end of which is attached to the beam A, between the handles B.

Having thus described my invention,

I claim as new, and desire to secure by Letters Patent—

An improved marker, formed by the combination of the standard E, pivoted bar F, adjustable marker bar G H I, adjustable supporting brace J K L, and adjustable arms M, with each other, substantially as herein shown and described, to adapt it for attachment to a plow-beam, as and for the purpose set forth.

ARTHUR C. SMITH.

Witnesses:
R. S. WELLS,
JNO. L. BAILY.